United States Patent
Priebe et al.

(10) Patent No.: US 11,858,030 B2
(45) Date of Patent: Jan. 2, 2024

(54) SIZING COMPOSITION FOR CASTING MOLDS FOR METAL CASTING, METHOD FOR PRODUCING THE CASTING MOLDS, AND CASTING MOLDS PROVIDED WITH THE SIZING COMPOSITION

(71) Applicant: ASK Chemicals GmbH, Hilden (DE)

(72) Inventors: Christian Priebe, Wülfrath (DE); Markus Bung, Essen (DE); Sarah Voss, Dormagen (DE); Jörg Körschgen, Leichlingen (DE)

(73) Assignee: ASK Chemicals GmbH, Hilden (DE)

( * ) Notice: Subject to any disclaimer, the term of this patent is extended or adjusted under 35 U.S.C. 154(b) by 529 days.

(21) Appl. No.: 17/261,130

(22) PCT Filed: Jul. 19, 2019

(86) PCT No.: PCT/DE2019/100669
§ 371 (c)(1),
(2) Date: Jan. 18, 2021

(87) PCT Pub. No.: WO2020/015791
PCT Pub. Date: Jan. 23, 2020

(65) Prior Publication Data
US 2021/0299740 A1    Sep. 30, 2021

(30) Foreign Application Priority Data
Jul. 20, 2018   (DE) .......................... 102018117651.1

(51) Int. Cl.
*B22C 3/00* (2006.01)
*B22C 9/02* (2006.01)
*C09D 7/63* (2018.01)
*B22C 1/22* (2006.01)
*B22C 9/12* (2006.01)
*C09D 1/00* (2006.01)

(52) U.S. Cl.
CPC ................ *B22C 3/00* (2013.01); *B22C 1/226* (2013.01); *B22C 9/02* (2013.01); *B22C 9/12* (2013.01); *C09D 1/00* (2013.01); *C09D 7/63* (2018.01)

(58) Field of Classification Search
CPC ................ B22C 3/00; B22C 9/12; B22C 9/18
See application file for complete search history.

(56) References Cited

U.S. PATENT DOCUMENTS

| 5,787,958 A * | 8/1998 | Shivkumar ............. B22C 7/023 164/249 |
| 2009/0095439 A1 | 4/2009 | Stotzel et al. |
| 2014/0242269 A1 | 8/2014 | Kloskowski et al. |
| 2014/0255601 A1 | 9/2014 | Kloskowski et al. |
| 2014/0352910 A1 | 12/2014 | Kloskowski et al. |

FOREIGN PATENT DOCUMENTS

| CN | 105363996 A | 3/2016 | |
| DE | 102005041863 A1 * | 3/2007 | ............... B22C 1/08 |

\* cited by examiner

*Primary Examiner* — Kevin E Yoon
(74) *Attorney, Agent, or Firm* — Standley Law Group LLP; Jeffrey S. Standley; Kenny W. Pung

(57) ABSTRACT

The subject matter of the invention are sizing compositions containing an aqueous carrier liquid, refractory base materials and CH-acidic compounds, as well as their use for casting molds, as well as casting molds coated with the sizing composition.

22 Claims, No Drawings

SIZING COMPOSITION FOR CASTING MOLDS FOR METAL CASTING, METHOD FOR PRODUCING THE CASTING MOLDS, AND CASTING MOLDS PROVIDED WITH THE SIZING COMPOSITION

The invention relates to a sizing composition for casting molds such as molds or cores for metal casting, and casting molds provided with the sizing composition. Moreover, the invention relates to the use of the sizing composition for casting molds.

BACKGROUND ON THE INVENTION

Casting molds are essentially comprised of molds or molds and cores which represent the negative form of the cast piece to be produced. The molds and cores here generally consist of a refractory mold base material, such as quartz sand, and a suitable binder which provides the casting mold with sufficient mechanical strength after removal from the mold tool. The refractory mold base material is preferably present in free-flowing form, so that after mixing with the binder it can be poured into a suitable hollow mold, compressed and then cured.

During casting, molds form the outer wall for the cast piece; cores are used to create hollow spaces within the cast piece. Here it is not absolutely essential that molds and cores consist of the same material. Thus, for example, in permanent mold casting, shaping the outer part of the cast pieces is done with the aid of permanent metal molds. A combination of molds and cores which were produced from mold material mixtures of different compositions by various methods is also possible.

If for the sake of simplicity below, only cores are mentioned, the statements also apply in equal measure to molds which are based on a same mold material mixture and were produced by the same method.

The mold(s) and possible cores are put together to form a core package and subsequently cast with liquid metal such as iron, steel, aluminum, bronze or other nonferrous metals. The liquid metal then fills the hollow spaces, thus forming the desired cast piece.

The high temperatures of the liquid metal, in particular, for example, with cast iron (casting temperatures between about 1300° C. and 1500° C.) or cast steel (casting temperatures between about 1500° C. and 1700° C.), as well as with light cast metal (aluminum, for example, 600-700° C.) lead to decomposition of the organic binder and heat the core or respectively the mold.

Quartz sand expands with an increase in temperature due to heat expansion until at 573° C. a change of form takes place from alpha- to beta-quartz, also known as quartz inversion, which brings with it a sudden increase in volume. A further change of form for the quartz sand takes place at 1470° C. from beta-quartz to (alpha) cristobalite, which is also accompanied by an increase in volume. However, this change of form depends not only on the phase change temperature, but also depends heavily on other parameters such as grain size or the temperature/time gradient.

These changes of volume are responsible for mechanical stresses in the microstructure of the sand near to the boundary surface between the molten metal and sand, which can lead to cracks in the molds/cores, which enable the penetration of molten metal into the molds/cores and thus veins arise at the surface of the casting.

Other types of sand—referred to as special sands, such as chrome ore sand, olivines, fireclay sand, bauxite sand or even specially produced sands—can also be used to produce molds and cores. These exhibit no phase transformation between 20° C. and 1700° C., less heat expansion and a tendency for significantly fewer vein defects. However, they are also significantly more expensive.

The method for producing casting molds and cores normally also comprises the application of a coating that is also termed size or a sizing composition. Sizes are coatings that are applied as films onto the molds or cores, in particular onto the surfaces that later come into contact with the liquid metal.

With the introduction of water-based sizes, it was noticed that the strengths of the cores treated with the water-based sizing composition decrease significantly. This sometimes reaches the point where the cores can no longer withstand the metallostatic pressure and can break during the casting process. This can be compensated for by a core with larger dimensions, which however limits the designing and construction freedom of components. Consequently, there has been no lack of approaches for controlling and increasing the moisture resistance of cores through the employed binder. Examples in this regard are the use of silanes or the addition of low molecular esters or anhydrides of carboxylic acids as they are as described in AT341125 B.

In the field of water glass-based binders, some improvements of core stability have been achieved. In this regard, DE 102011114626 A1 describes sizes containing a high level of solids, and DE 102011115025 A1 proposes the addition of divalent metal salts to improve the size stability of the cores.

The normally used sizes contain for example pyrophyllite, mica, zirconium silicate, andalusite, fireclay, iron oxide, kyanite, bauxite, olivine, aluminum oxide, quartz, talcum, calcined kaolins (metakaolin) and/or graphite alone or mixtures thereof as the refractory base materials. These base materials are the functional portion of the sizes that cover the mold surface and close the pores against the penetration of the casting metal.

The surface of the casting mold can therefore be modified by these coatings and matched with the properties of the metal to be processed. The appearance of the cast piece can therefore be improved by the sizing composition since a smooth surface is generated because irregularities which are caused by the size of the grains of the mold material are compensated by the sizing composition. Moreover, the sizing composition can metallurgically influence the cast piece in that, for example, additives that improve the surface properties of the cast piece are selectively transferred into the cast piece by the sizing composition on the surface of the cast piece. Furthermore, the sizes form a layer that protects the casting mold from liquid metal during casting. This prevents any adhesion between the cast piece and casting mold so that the cast piece can be more easily removed from the casting mold.

The sizing composition can, however, also be used to intentionally control the transfer of heat between the liquid metal and the casting mold in order, for example, to create a certain metal structure through the cooling rate.

Formic acid esters in which the alcohol group can be between C1 to C8 atoms long is proposed in DE 102011115024 A1. These increase the strengths of the cores treated with this sizing composition.

None of the documents cited above report the use of CH-acidic substances in the size.

OBJECT OF THE INVENTION

The inventors have made it their objective to provide a water-based sizing composition that can be used in all conventional core production methods, that reliably reduces casting flaws, and that leads to improved moisture resistance of the cores and molds coated therewith. In many cases, less mold material binder can be used due to the increased moisture resistance. Moreover, the formaldehyde emission is reduced when binders containing formaldehyde as the residual monomer and/or such binders that release formaldehyde are used in the mold material mixture, in particular while drying the sizes under heat.

SUMMARY OF THE INVENTION

The subject matter of the invention is a sizing composition for molds or cores for metal casting containing at least one CH-acidic compound having the following structural element:

—C(=O)—CH$_2$—C(=O)— and molds or cores provided with the sizing composition. Moreover, the invention relates to a method for producing molds and cores by using mold material mixtures and coatings of the mold material mixtures at least partially hardened into molds or cores with the sizing composition, as well as coated molds and cores produced according to this method as described in the independent claims. Advantageous embodiments are the subject matter of the dependent claims or are described below.

It was surprisingly found that when certain CH-acidic compounds are used in the sizing composition, the moisture resistance of coated and dried cores can be significantly improved. This opens up the possibility of designing thinner core parts with the same strength and/or also using water-based sizes in regions with unfavorable climates (high humidity). Improved moisture resistance of the cores also makes it possible to use less core sand binder, which positively affects the emissions and gas production. This offers not just an ecological advantage, but also an economical one.

The mold material mixtures comprise at least:
a refractory mold base material,
a binder, or respectively binder system, and
if applicable, one or more mold material additives.
The cores and molds produced with this mold material mixture are obtained by
self-curing, for example
  a. by catalysts contained in the binder (such as liquid amines), or
  b. catalysts in liquid form such as carbonates, esters or acids (depending on the method) added to the mold material mixture
a gassing process with tertiary amines, $CO_2$, $SO_2$ or methyl formiate (depending on the method), or
hot curing, for example at temperatures above 80° C. and in particular above 100° C.

The at least partially cured cores and molds produced in this manner are then provided, at least on patches, with the sizing composition according to the invention in the form of a film or a coating. The sizing composition can be brought into contact with the core or the mold by spraying, painting, dipping or flooding. In the ready-to-use state, the sizing composition is a liquid with solids suspended therein.

To remove the carrier liquid in the size, generally water or low-boiling alcohols, the size is dried in air or at an elevated temperature of 60° C. to 220° C., in particular 100 to 200° C., preferably 120 to 180° C., for example in a continuous furnace or batch furnace, by means of IR emitters or a microwave.

DETAILED DESCRIPTION OF THE INVENTION

It was surprisingly found that, with the addition of the CH-acidic compounds with the following structural element (group)

—C(=O)—CH$_2$—C(=O)— to an aqueous or alcohol-containing, preferably aqueous, sizing composition, the quality of the sized cores and molds can be permanently improved, and for example a storage stability of the cores and molds of several days can be easily achieved. All compounds are suitable that have at least one $CH_2$ group that is surrounded by carbonyl carbon atoms (C=O).

The CH-acidic compounds used according to the invention are therefore β-dicarbonyl compounds (1,3-dicarbonyl compounds) having one or more of the following group(s):

—C(=O)—CH$_2$—C(=O)—

Particularly preferably, the group has the following structure:

$$R^1C(=O)—CH_2—C(=O)—O— \qquad (I)$$

in which
  $R^1$ is H,
  a C1 to C18 hydrocarbon, preferably a C1 to C12 hydrocarbon or —CH$_2$—X, wherein X is a group which contains, along with hydrogen atoms, 1 to 18 carbon atoms, in particular 1 to 12 carbon atoms, and particularly preferably 1 to 8 carbon atoms, and 1 to 3 oxygen atoms; oxygen can be contained, for example, in the form of ether groups, or —O—Y, wherein Y=X (with the above meaning), or H.

According to one embodiment, $R^1$ is not bound by an oxygen atom to the carbonyl carbon atom. Examples of $R^1$ are H, alkyl, alkenyl, aryl, alkylaryl or alkenylaryl groups.

The β-dicarbonyl compounds have in particular the following structure:

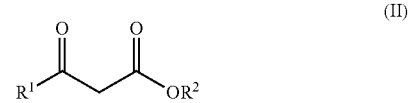

(II)

in which
  $R^1$ has the above meaning, and in particular is a C1 to C18 hydrocarbon, preferably a C1 to C12 hydrocarbon, and
  $R^2$ is H,
    a C1 to C18 hydrocarbon, preferably a C1 to C12 hydrocarbon, wherein possibly 1 to 3 oxygen atoms can be contained in the hydrocarbon, in the form of ether groups, for example. Examples of $R^2$ are alkyl, alkenyl, aryl, alkoxy, alkenyloxy or aryloxy groups.

It is likewise possible that the β-dicarbonyl compound is one which has multiple β-dicarbonyl groups (I), for example 2 to 4, in particular those according to the formula (II) which are linked via $R^2$ and thus have multiple CH-acidic groups in the molecule (see for example CAS 22208-25-9).

CH acidity is the tendency of a compound to donate the hydrogen atom bonded to a carbon atom as a proton and therefore act formally as an acid. Unsubstituted alkanes have high pKa values (for example, approximately 50 for ethane). However, if the carbon atom is bonded to strongly electrophilic groups such as carbonyls (in an ester, ketone or aldehyde) at the α-position relative to these groups, then the particularly pronounced negative inductive effect ensures that the CH bond at the α carbon atom is more polarized and the proton can be cleaved off more easily. According to the present invention, the pKa value of the CH-acidic CH$_2$ group is preferably less than 15, in particular 5 to 12 (in each case at 298 K and with reference to the donation of the first proton, pKa$_1$).

β-keto esters are particularly preferred. The following β-keto esters are given as examples:

methyl acetoacetate (acetoacetic acid methyl ester, 3-oxobutanoic acid methyl ester—CAS: 105-45-2),

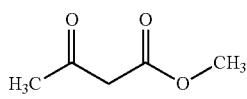

ethyl acetoacetate (acetoacetic acid ethyl ester, 3-oxobutanoic acid ethyl ester—CAS: 141-97-9),

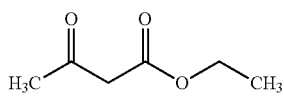

isopropyl acetoacetate (isopropyl 3-oxobutanoate—CAS: 542-08-5),

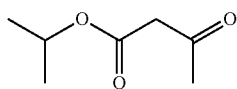

isobutyl acetoacetate (CAS: 7779-75-1),

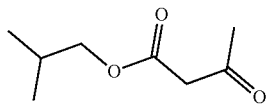

t-butyl acetoacetate (CAS: 1694-31-1),

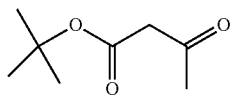

benzyl acetoacetate (CAS: 5396-89-4),

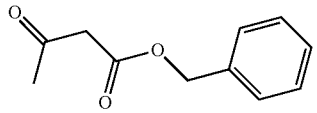

dodecyl acetoacetate (CAS: 52406-22-1),

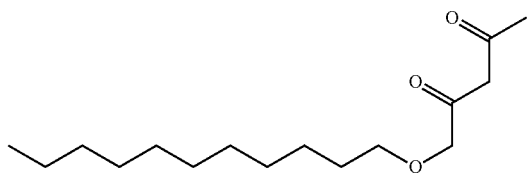 [SMILES: CCCCCCCCCCCOCC(=O)CC(C)=O]

ethyl benzoylacetate (CAS: 94-02-0),

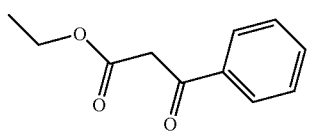

2-methoxyethyl acetoacetate (CAS: 22502-03-0),

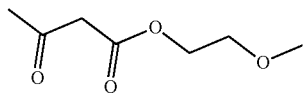

2-(acetoacetoxy)ethyl methacrylate (CAS: 21282-97-3),

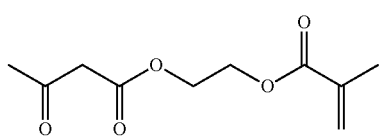

methyl 4-methyl-3-oxopentanoate (CAS: 42558-54-3) and

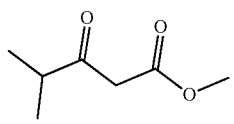

propane-1,1,1-triyltrimethyl tris(acetoacetate)/(2-ethyl-2-(hydroxymethyl)-1,3-propanedioltriacetoacetate (CAS: 22208-25-9).

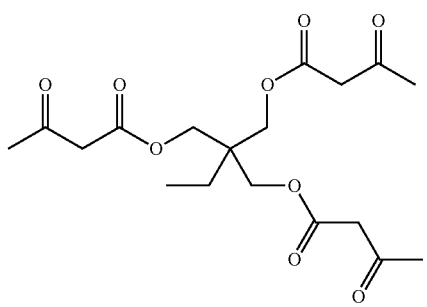 [SMILES: CCC(COC(=O)CC(C)=O)(COC(=O)CC(C)=O)COC(=O)CC(C)=O]

Malonic acid, malonic acid mono- and diesters of alcohols with a C-chain of C1 to C18, methyl acetoacetate, ethyl acetoacetate, benzyl acetoacetate, dodecyl acetoacetate, ethyl benzoylacetate, 2-methoxyethyl acetoacetate, 2-(acetoacetoxy)ethyl methacrylate and propane-1,1,1-triyltrimethyl tris(acetoacetate) are preferred. Methyl acetoacetate, ethyl acetoacetate and propane-1,1,1-triyltrimethyl tris(acetoacetate) are particularly preferred. Methyl acetoacetate and ethyl acetoacetate are most preferred. Mixtures of these are also possible.

β-dicarbonyl compounds (II) containing nitrogen are also suitable. Examples in this case are:
N-methyl acetoacetamide (CAS: 20306-75-6),

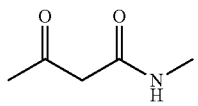

N,N-dimethyl acetoacetamide (CAS: 2044-64-6)

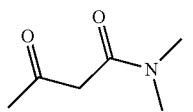

and N,N-diethyl acetoacetamide (CAS: 2235-46-3).

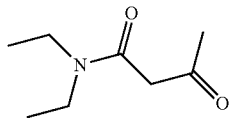

The sizing composition has for, example, a pH of 6 to 10, preferably 6.5 to 8.5 (at 298 K).

The overall amount of the CH-acidic compounds relative to the size in the marketable and/or usable state, i.e., independent of the dilution, is 0.1 to 10% by weight, preferably 0.5 to 8% by weight, particularly preferably 0.5 to 7% by weight, and most preferably 0.7-5% by weight or also 0.8-3% by weight.

The CH-acidic compound can be contained in the finished, delivered sizing composition, or added during the optional dilution process for producing the ready-to-use sizing composition. The addition of the CH-acidic compound changes the other known size properties only slightly to not at all.

Other characteristic parameters of the sizing composition can be adjusted depending on the desired use of the sizing composition, for example as a primer coat or as a topcoat, and the desired layer thickness of the coating produced from the sizing composition.

The carrier liquid can consist partially or completely of water. The carrier liquid is the component that can evaporate at 160° C. and normal pressure (1013 mbar) and is therefore in the present case by definition that which is not the solid content. The carrier liquid contains more than 50% by weight, preferably 75% by weight, in particular more than 80% by weight, if applicable more than 95% by weight water.

The other components of the carrier liquid can be organic solvents. Suitable solvents are alcohols including polyalcohols and polyether alcohols. Examples of alcohols are ethanol, n-propanol, isopropanol, n-butanol, glycols, glycol monoether and glycol monoester.

The solid content of the ready-to-use sizing composition is preferably adjusted to be within a range of 10 to 70% by weight, or respectively in the marketable form (before dilution) in particular 30 to 80% by weight. The sizing composition comprises at least 20% by weight carrier liquid, preferably more than 40% by weight.

Therefore the sizing composition according to the invention comprises at least one refractory base material that is powdered before being added to the sizing composition. The refractory base material serves to close the pores in a casting mold against the penetration of the liquid metal. Moreover, thermal insulation between the casting mold and liquid metal is achieved by the refractory base material. In particular, materials are suitable as refractory base materials that have a melting point which lies at least 200° C. above the temperature of the liquid metal to be cast (at least more than 900° C.) and, independent of this, does not engage in any reaction with the metal if at all possible.

For example, pyrophyllite, mica, zirconium silicate, andalusite, fireclay, iron oxide, kyanite, bauxite, olivine, aluminum oxide, quartz, talcum, calcined kaolins (metakaolin) and/or graphite alone or as mixtures thereof can be used as the refractory base materials (for the size).

For the clay, the D10 percent passing for the grain size can preferably be 0.01 µm to 5 µm, more preferably 0.01 µm to 1 µm, particularly preferably 0.01 µm to 0.2 µm. Preferably, the clay can have a D01 percent passing for the grain size of 0.001 µm to 0.2 µm, more preferably 0.001 µm to 0.1 µm, and particularly preferably 0.001 µm to 0.05 µm.

For mica, the D90 percent passing can preferably be 100 µm to 300 µm, more preferably 150 µm to 250 µm, and particularly preferably 200 µm to 250 µm. Preferably, the D50 percent passing for mica can be 45 µm to 125 µm, more preferably 63 µm to 125 µm, and particularly preferably 75 µm to 125 µm. Preferably, the D10 percent passing can have a grain size of 1 µm to 63 µm, more preferably 5 µm to 45 µm, and particularly preferably 10 µm to 45 µm. Preferably, the D01 percent passing can be 0.1 µm to 10 µm, more preferably 0.5 µm to 10 µm, particularly preferably 1 µm to 5 µm.

Moreover, the grain size of other refractory materials is not especially restricted; any routine grain sizes from 1 µm to 300 µm, particularly preferably 1 µm to 280 µm, can be used.

The grain size distribution of the individual solid components of the sizing composition can be determined using the D90, D50, D10 and D01 percent passing. These are a measure of the particle size distribution. In this case, the D90, D50, D10, or respectively D01 percent passing designate the portions in 90%, 50%, 10%, or respectively 1% of the particles that are smaller than the designated diameter. Given a D10 value of for example 5 µm, 10% of the particles have a diameter less than 5 µm. The grain size and the D90, D50, D10 and D01 percent passing can be determined by means of laser diffraction granulometry according to ISO13320. The percent passing is indicated based on volume. With nonspherical particles, a hypothetical spherical grain size is calculated, and the corresponding diameter is used as the basis. The grain size is accordingly equivalent to the calculated diameter.

The particle diameter and its distribution are determined by laser refraction in a water/isopropanol mixture, wherein the suspension is (only) maintained by stirring, using a Horiba LA-960 laser light scattering spectrometer by Retsch based on static laser light scattering (according to DIN/ISO 13320) while using the Fraunhofer model for evaluation.

In so doing, the grain size is chosen so that a stable structure arises in the coating and the sizing composition can for example be distributed easily on the wall of the casting mold with a spray device.

The portion of the refractory base material relative to the solid portion of the sizing composition is preferably selected to be greater than 65% by weight, preferably greater than 70% by weight, and particularly preferably greater than 80% by weight.

The sizing composition according to the invention can comprise at least one suspension agent according to one embodiment. The suspension agent causes an elevation in the viscosity of the size so that the solid components of the sizing composition do not sink in the suspension, or only sink to a slight extent. To elevate the viscosity, both organic as well as inorganic materials or mixtures of these materials can be used.

Swellable layer silicates that are capable of incorporating water between the layers can be contained as the suspension agent; preferably, the swellable layer silicate consisting of attapulgite (palygorskite), serpentines, kaolins, smectites (such as saponite, montmorillonite, beidellite and nontronite), vermiculite, illite, spiolite, synthetic lithium magnesium layer silicate, LAPONITE® RD and mixtures thereof can be selected; attapulgite (palygorskite), serpentines, smectites (such as saponite, beidellite and nontronite), vermiculite, illite, spiolite, synthetic lithium magnesium layer silicate, LAPONITE® RD and mixtures thereof are particularly preferable; the swellable layer silicate can particularly preferably be attapulgite.

Alternatively or in addition, organic thickeners can also be selected as the suspension agent since they can dry sufficiently after the protective coating has been applied for them to scarcely release any water upon contacting the liquid metal. Swellable polymers such as carboxymethyl, methyl, ethyl, hydroxyethyl and hydroxypropyl cellulose, mucilages, polyvinyl alcohols, polyvinyl pyrrolidone, pectin, gelatins, agar agar, polypeptides and/or alginates are for example possible as the organic suspension agent.

The portion of inorganic suspension agents relative to the overall sizing composition is preferably selected to be 0.1 to 5% by weight, preferably 0.5 to 3% by weight, and particularly preferably 1 to 2% by weight.

The portion of organic suspension agent relative to the overall sizing composition is preferably selected to be 0.01 to 1% by weight, preferably 0.01 to 0.5% by weight, and particularly preferably 0.01 to 0.1% by weight.

The sizing composition can, for example, comprise the combination of certain clays as contents of the sizes, which also function as the suspension agent. Particularly suitable as the clay materials, a combination of the following is used:
   a) 1 to 4 parts by weight, in particular 1 to 2.2 parts by weight palygorskite,
   b) 1 to 4 parts by weight, in particular 1 to 2.2 parts by weight hectorite, and
   c) 1 to 4 parts by weight, in particular 1 to 2.2 parts by weight sodium bentonite
   (each relative to each other), in particular at a weight ratio of palygorskite to hectorite of 1 to 0.8-1.2, and a ratio of palygorskite to hectorite together to sodium bentonite of 1 to 0.8-1.2.

The overall content of the above clays in the sizing composition is 0.1 to 4.0% by weight, preferably 0.5 to 3.0% by weight, and particularly preferably 1.0 to 2.0% by weight relative to the solid content of the sizing composition.

According to a preferred embodiment, a sizing composition is used comprising a solid component that comprises a clay and mica, wherein the clay comprises 50 to 90% by weight kaolinite and 5 to 35% by weight montmorillonite, wherein the sizing composition comprises 5 to 50 parts by weight clay relative to the solid component.

According to a preferred embodiment, the sizing composition according to the invention comprises at least one binder as an additional component. The binder allows the sizing composition, or respectively the protective film produced from the sizing composition, to adhere better to the wall of the casting mold. Moreover, the binder increases the mechanical stability of the size coating so that less erosion from the effect of the liquid metal is observed. Preferably, the binder cures irreversibly so that an abrasion-resistant coating is obtained. Particularly preferred are binders that do not resoften upon contact with humidity. Clays, in particular bentonite and/or kaolin, can for example be used as binders. Other suitable binders are for example starches, dextrin, peptides, polyvinyl alcohol, polyvinyl acetate copolymers, polyacrylic acid, polystyrene, polyvinyl acetate polyacrylate dispersions, and mixtures thereof.

The portion of the binder is preferably selected to be within a range of 0.1 to 20% by weight, particularly preferably 0.5 to 5% by weight, and most preferably 0.2 to 2% by weight relative to the solid content of the sizing composition.

According to another preferred embodiment, the sizing composition contains a portion of graphite. This supports the formation of lamellar carbon at the boundary surface between the cast piece and casting mold. The portion of the graphite is preferably selected to be within a range of 0 to 30% by weight, preferably 1 to 25% by weight, and particularly preferably 1 to 20% by weight relative to the solid content of the sizing composition. In casting iron, graphite has a favorable effect on the surface quality of the cast piece.

Anionic and non-anionic surfactants, particularly those with an HLB value of at least 7, can be used as a wetting agent. One example of such a wetting agent is dioctyl disodium sulfosuccinate. The wetting agent is preferably used in an amount of 0.01 to 1% by weight, preferably 0.05 to 0.3% by weight, relative to the ready-to-use sizing composition.

Defoaming agents, or also termed anti-foaming agents, can be used to prevent foam formation in the production of the sizing composition or when applying the same. Foam formation during the application of the sizing composition can lead to an uneven layer thickness and to holes in the coating. Silicone oil or mineral oil can for example be used as the defoaming agent. Preferably, the defoaming agent is contained in an amount of 0.01 to 1% by weight, preferably 0.05 to 0.3% by weight, relative to the ready-to-use sizing composition.

In the sizing composition according to the invention, routine pigments and dyes may be used if applicable. These are added in order to achieve a different contrast, for example between different layers, or respectively to bring about a stronger separating effect of the sizes from the casting. Examples of pigments are red and yellow iron oxide as well as graphite. Examples of dyes are commercially available dyes such as the Luconyl® color series by BASF SE. The dyes and pigments are preferably contained in an amount of 0.01 to 10% by weight, preferably 0.1 to 5% by weight, relative to the solid content of the sizing composition.

According to another embodiment, the sizing composition contains a biocide to prevent bacterial infestation and thus to prevent a negative influence on the rheology and binding force of the binder.

This is particularly preferred when the carrier liquid contained in the sizing composition is essentially made of water relative to the weight, i.e., the sizing composition according to the invention is provided in the form of a so-called water size.

Examples of suitable biocides are formaldehyde, formaldehyde separators, 2-methyl-4-isothiazolin-3-one (MIT), 5-chloro-2-methyl-4-isothiazolin-3-one (CIT), 1,2-benzisothiazolin-3-one (BIT), and biocidally active substances containing bromine and nitrile groups. The biocides are normally used in an amount of 10 to 1000 ppm, preferably 50 to 500 ppm relative to the weight of the ready-to-use sizing composition.

The sizing composition according to the invention can be produced by taking water and, by using a high-shearing agitator, solubilizing a clay therein acting as a suspension agent. Then the refractory base material, pigments (if present) and dyes (if present) are stirred in until a homogeneous mixture arises. Finally, wetting agents (if present), anti-foaming agents (if present), biocides (if present), binders (if present) and the CH-acidic compound(s) are stirred in.

The sizing composition according to the invention can be produced and marketed as a sizing composition that is formulated to be ready-to-use. The sizing composition according to the invention can however also be produced and marketed in a concentrated form. In this case, to provide a ready-to-use sizing composition, the amount of the (additional) carrier liquid that is needed to adjust the desired viscosity and density of the sizing composition is added. Moreover, the sizing composition according to the invention can also be provided and marketed in the form of a kit, wherein for example the solid components, the CH-acidic compound(s) and the solvent component are adjacent in separate containers or the CH-acidic compound(s) is part of the solvent component. The solid components can be provided as a powdered solid mixture in a separate container. Other liquid components that may be used such as for example binders, wetting agents, humectant/defoaming agents, pigments, dyes and biocides can also be present in this kit in a separate container. The solvent component can either comprise the additional components that may be used, for example in a common container, or they can be present in a separate container apart from other optional components.

It is also possible to apply several layers of size, namely either the same size in several layers in order to produce the desired layer thickness, or different sizes, wherein the size with the CH-acidic compounds preferably forms the last coating.

The dry layer thickness of the topcoat is for example 0.01 mm to 1 mm, preferably 0.05 mm to 0.8 mm, more preferably 0.1 mm to 0.6 mm, and most preferably 0.2 mm to 0.3 mm.

The dry layer thickness of the coating is determined either by measuring the dimensions of bending bars before and after sizing (dry) with a micrometer screw (preferably), or by measuring using the wet layer thickness gauge. The layer thickness can for example be determined with the gauge by scratching away the coating using the end marks of the gauge until the subsurface appears. The layer thickness can then be read from the markings on the teeth. Instead, the wet layer thickness can also be measured in a matte state according to DIN EN ISO 2808.

The sizing compositions according to the invention are suitable for coating casting molds. The expression "casting mold" used here includes all types of bodies that are needed to produce a cast piece such as cores, molds and permanent molds.

The use according to the invention of the sizing compositions also includes partially coating casting molds.

The mold material mixtures for producing the casting molds comprise at least:
a refractory mold base material,
a binder, or respectively binder system, and
if applicable one or more mold material additives.

The refractory mold base materials are a suitable refractory mold base material or a mixture of multiple materials of this type, predominantly comprising quartz sand, wherein the quartz sand can be present as new sand or regenerated old sand or any mixture of the two.

With the lost foam or full mold method, foamed polystyrene, or respectively copolymers consisting of polystyrene and methacrylate models, are coated with a refractory size which is then dried in a furnace or microwaves. In this case, the size also serves to build up a separation layer between the metal that has been poured in and the sand as background stabilization. CH-acidic compounds can also be added to these layers in order to reduce the formaldehyde emissions during casting.

Conventional, known materials and their mixtures can be used as a refractory mold c for the production of casting molds. Suitable examples are quartz sand, zircon sand or chrome ore sand, olivine, vermiculite, bauxite, fireclay and so-called artificial mold base materials, i.e., mold base materials that were shaped spherically, or approximately spherically (such as ellipsoidal) by industrial processes of forming. Examples of this are glass beads, glass granulate or artificial, spherical, ceramic sands—so-called Cerabeads® as well as Spherichrome®, SphereOX® or "Car-boaccu-cast" and hollow microspheres, such as hollow aluminum silicate spheres (so-called microspheres) which can be isolated as a component of fly ash among other things. Mixtures of the mold base materials mentioned are also possible.

Materials that have a high melting point (melting temperature) are considered to be a mold material, or respectively refractory mold base material. Preferably, the melting point of the refractory mold base material is greater than 600° C., preferably greater than 900° C., particularly preferably greater than 1200° C., and especially preferably greater than 1500° C.

The refractory mold base material preferably comprises more than 70% by weight, in particular more than 80% by weight, particularly preferably more than 85% by weight, of the mold material mixture.

The average diameter of the refractory mold base materials generally lies between 80 μm and 600 μm, preferably between 100 μm and 550 μm and particularly preferably between 130 μm and 500 μm. The particle size can be determined for example by passing through a sieve in accordance with DIN ISO 3310. There is a particular preference for particle shapes with the greatest linear extension to the smallest linear extension (at a right angle with respect to one another and in each case for all directions in space) having a ratio of 1:1 to 1:5 or 1:1 to 1:3, i.e. those which are, for example, not fibrous.

The refractory mold base material is preferably in a free-flowing state, in particular in order to be able to process the mold material mixture according to the invention in conventional core shooters.

Various inorganic and organic binder systems can be used as binding agents. The following methods and their associated binders can be cited as examples:

| | |
|---|---|
| PU cold-box method | Two-component binder comprising a polyol (benzyl ether resin) and a polyisocyanate component, curing: gaseous tertiary amine |
| PU no-bake process | Two-component binder comprising a polyol (benzyl ether resin) and a polyisocyanate component, curing: liquid amine |
| Resol $CO_2$ method | Highly alkaline phenol resols containing a boron compound, curing $CO_2$ |
| Resol ester method | Highly alkaline resols ALPHASET ™ method: Curing: liquid ester BETASET ™ curing: gaseous methyl formiate |
| Hot-box method | Resols, furan resins, urea resins or mixed resins, curing: latent acids plus the effect of heat |
| Warm-box method | Furan resins, curing: latent acid plus the effect of heat |
| Inorganic method | Binder based on silicate, curing: by the effect of heat or $CO_2$ |
| Shell sand method | Novolac, curing: Hexamethylene triamine and curing: latent acids plus the effect of heat |
| No-bake method | Resols, furan resins or mixed resins, acid curing |
| Epoxy $SO_2$ method | Mixture of epoxy resins and acrylates, $SO_2$ added for curing |
| ISOMAX ™ | A mixture of cold-box epoxy-acrylate hybrid binder and epoxy $SO_2$ process, curing: gaseous tertiary amine (for example, according to U.S. Pat. No. 5,880,175) |

Binders are preferred from the group of PU cold box, PU no bake, Resol $CO_2^-$, Betaset or Epoxy $SO_2$ methods.

The binders are added to the mold base material. The base material mixture may contain additional substances such as mold material additives like anti-veining additives.

Any of the aforementioned binding agents can be used as a binder in an amount of approximately 0.4% by weight to approximately 7% by weight, preferably from approximately 0.5% by weight to approximately 6% by weight and particularly preferably from approximately 0.5% by weight to approximately 5% by weight, with reference in each case to the mold material mixture.

To produce the mold material mixture, first the components of the binder system can be combined and then added to the refractory mold base material. However, it is also possible to add the components of the binder to the refractory mold base material at the same time or sequentially in any order. Conventional methods can be used to achieve a uniform mixture of the components in the mold material mixture.

Experimental part
All percentages refer to percent by weight
The following were used:

Supplier: ASK-Chemicals GmbH:

| | |
|---|---|
| ECOCURE ™ 30 BG 5: | benzyl ether resin in esters |
| ECOCURE ™ 60 BG 5: | polymeric MDI in aromatic solvents |
| ECOCURE ™ BLUE 30 HE 1: | benzyl ether resin in esters |

Experimental part
All percentages refer to percent by weight
The following were used:

| | |
|---|---|
| ECOCURE ™ BLUE 60 HE 1: | polymeric MDI in alkylbenzene |
| CATALYST 706 | dimethyl propylamine |
| MIRATEC ™ MB 522 | water-based size |
| MIRATEC ™ TS 505 | water-based size |
| VELVACOAT ™ AC 501 | alcohol-based size |
| NOVANOL ™ 165 | alkaline phenol resol resin for the Resol/$CO_2$ method |

Ethyl acetoacetate (EAA), supplied by Sigma Aldrich
Propane-1,1,1-triyltrimethyl tris(acetoacetate) (AATMP) - supplied by Sigma Aldrich
Diethyl malonate (MEE), supplied by Sigma Aldrich
2-(cetoacetoxy)ethyl methacrylate (AAEMA), supplied by Sigma Aldrich
DBE - a mixture of dimethyl succinate, dimethyl glutarate and dimethyl adipate (supplied by Chemoxy)
Ethylene urea (EHS) - supplied by BASF SE
Additive X - a mixture of sawdust, coke dust and phenol resin The symbols ®, or respectively ™ are used in each case to indicate registered trademarks at least for Germany and/or the USA for the corresponding owners. In the text below, ®, or respectively ™ will not be used for the sake of brevity, and in this respect reference is made herewith to the table above.

Production of the Sizes:

The CH-acidic compounds listed in the table of results, or respectively the comparative substances, were stirred into the commercially available MIRATEC MB 522 (or respectively another size, see tables of results) while stirring. The MIRATEC MB 522 obtained in a delivered state (or respectively another size, see tables of results) was adjusted to a viscosity suited for the application using tap water (Ford beaker 4 mm, flow time 11-13 sec.), and the CH-acidic compound, or respectively the comparative substances, was stirred in dropwise over 10 minutes while stirring.

Cold Box Method:

Determining Strength in $N/cm^2$

In a Hobart mixer, a sand mixture consisting of quartz sand H 32, plus 0.60% ECOCURE 30 BG 5, or respectively ECOCURE BLUE 30 HE 1 (in each case individually for examples A1 to B25) and 0.60% ECOCURE 60 BG 5, or respectively ECOCURE BLUE 60 HE 1 (in each case individually for examples A1 to B25) was mixed until homogeneous over two minutes. This sand mixture was transferred to a Roeper H 1 core shooter and two cores with dimensions (l×w×h) of 220 mm×22.4 mm×22.4 mm were each shot with a 4 bar shooting pressure into the mold by compressed air. The sand was cured with CATALYST 706 (0.5 ml, 10 second gassing time at a 2 bar flushing pressure).

After curing, the core was removed and a 10-minute-old core was dipped into the stirred sizing composition for 4 seconds to determine the size resilience.

After waiting for 30 minutes at room temperature, the pair of cores was dried after sizing for 30 minutes at 150° C. in a circulating air dryer. The cooled cores were then stored at room temperature (20-25° C.) and in a closed box in a steam-saturated atmosphere (98% relative humidity, RH for short) for x hours (h). After the time periods defined in the tables of results, a pair of cores was removed and the bending strength was determined using the Multiserw device (by Morek).

TABLE 1

| | Comparison | | |
|---|---|---|---|
| | A 1 | A 2 | A 3 |
| Added to size | None | 2% DBE | 2% EHS |
| 24 h 98% RH | 250 | 251 | 248 |

| | According to the invention | | | | |
|---|---|---|---|---|---|
| | B 1 | B 2 | B 3 | B 4 | B 5 |
| Added to size | 1% EAA | 2% EAA | 3% EAA | 4% EAA | 5% EAA |
| 24 h 98% RH | 265 | 268 | 286 | 295 | 310 |

Table 1 shows the strengths in N/cm² of sized cores that were produced with the binder system ECOCURE 30 BG 5/ECOCURE 60 BG 5. The size is MIRATEC MB522 that was unmodified, or modified with substances according to the invention or not according to the invention.

TABLE 2

| | Comparison | | |
|---|---|---|---|
| | A 1 | A 2 | A 3 |
| Added to size | None | 2% DBE | 2% EHS |
| 24 h 98% RH | 250 | 251 | 248 |

| | According to the invention | | | | |
|---|---|---|---|---|---|
| | B 6 | B 7 | B 8 | B 9 | B 10 |
| Added to size | 1% AATMP | 2% AATMP | 1% AAEMA | 2% AAEMA | 2% MEE |
| 24 h 98% RH | 293 | 313 | 327 | 335 | 318 |

Table 2 shows the strengths in N/cm² of sized cores that were produced with the binder system ECOCURE 30 BG 5/ECOCURE 60 BG 5. The size is MIRATEC MB522 that was unmodified, or modified with substances according to the invention or not according to the invention.

TABLE 3

| | Comparison | | |
|---|---|---|---|
| | A 4 | A 5 | A 6 |
| Added to size | None | 2% DBE | 2% EHS |
| 96 h 98% RH | 297 | 296 | 282 |

| | According to the invention | | | | |
|---|---|---|---|---|---|
| | B 11 | B 12 | B 13 | B 14 | B 15 |
| Added to size | 1% EAA | 2% EAA | 3% EAA | 4% EAA | 5% EAA |
| 96 h 98% RH | 308 | 315 | 327 | 335 | 342 |

Table 3 shows the strengths in N/cm² of sized cores that were produced with the binder system ECOCURE BLUE 30 HE 1/ECOCURE BLUE 60 HE 1. The size is MIRATEC MB522 that was unmodified, or modified with substances according to the invention or not according to the invention.

TABLE 4

| | Comparison | | |
|---|---|---|---|
| | A 4 | A 5 | A 6 |
| Added to size | None | 2% DBE | 2% EHS |
| 96 h 98% RH | 297 | 296 | 282 |

| | According to the invention | | | | |
|---|---|---|---|---|---|
| | B 16 | B 17 | B 18 | B 19 | B 20 |
| Added to size | 1% AATMP | 2% AATMP | 1% AAEMA | 2% AAEMA | 2% MEE |
| 96 h 98% RH | 329 | 340 | 322 | 337 | 329 |

Table 4 shows the strengths in N/cm² of sized cores that were produced with the binder system ECOCURE BLUE 30 HE 1/ECOCURE BLUE 60 HE 1. The size is MIRATEC MB522 that was unmodified, or modified with substances according to the invention or not according to the invention.

TABLE 5

| | Comparison | | |
|---|---|---|---|
| | A 7 | A 8 | A 9 |
| Added to size | None | 2% DBE | 2% EHS |
| 96 h 98% RH | 285 | 288 | 275 |

| | According to the invention | | | | |
|---|---|---|---|---|---|
| | B 21 | B 22 | B 23 | B 24 | B 25 |
| Added to size | 1% EAA | 2% EAA | 3% EAA | 4% EAA | 5% EAA |
| 96 h 98% RH | 304 | 312 | 328 | 338 | 349 |

Table 5 shows the strengths in N/cm² of sized cores that were produced with the binder system ECOCURE BLUE 30 HE 1/ECOCURE BLUE 60 HE 1. The size is MIRATEC TS 505 which was unmodified, or modified with substances according to the invention or not according to the invention.

Resol/CO₂ Method:
Determining Strength in N/Cm²

A sand mixture consisting of quartz sand H 32 plus 2.5% Novanol 165 was mixed in a Hobart mixer for 2 minutes. This sand mixture was transferred to a Roeper H 1 core shooter and two cores with dimensions (l×w×h) of 220 mm×22.4 mm×22.4 mm were each shot with a 4 bar shooting pressure into the mold by compressed air. The sand was cured with $CO_2$ gas (30 sec gassing time at a 2 bar flushing pressure). After curing, the core was removed and a 60-minute-old core was dipped in the sizing composition for 4 seconds to determine the size resilience. After waiting for 30 minutes at room temperature, the pair of cores was dried after sizing for 30 minutes at 150° C. in a circulating air dryer. The cooled cores were then stored at room temperature (20-25° C.) and in a closed box in a steam-saturated atmosphere (98% relative humidity—RH for short) for x hours (h). After specific periods of time, a pair of cores was removed and the bending strength was determined using the Multiserw device (by Morek).

Alcohol Size VELVACOAT AC 501:

After curing, the core was removed and a 60-minute-old core was dipped in the stirred size VELVACOAT AC 501, or respectively in the VELVACOAT AC 501 modified with CH-acidic substances, to determine the size resilience. After the alcohol was evaporated at room temperature, the pair of cores was stored in a closed box in a steam-saturated atmosphere (98% relative humidity, RH for short) for x hours (h). After specific periods of time, a pair of cores was removed and the bending strength was determined using the Multiserw device (by Morek).

TABLE 6

|  | Comparison | | | According to the invention | |
|---|---|---|---|---|---|
|  | A 10 | A 11 | A 12 | B 26 | B 27 |
| Added to size | None | 1% DBE | 1% EHS | 1% EAA | 1% AATMP |
| 24 h 98% RH | 82 | 75 | 78 | 90 | 113 |
| 48 h 98% RH | 80 | 76 | 72 | 90 | 109 |
| 120 h 98% RH | 81 | 72 | 65 | 91 | 107 |

Table 6 shows the strengths in N/cm² of sized cores that were produced using the binder system NOVANOL 165. The size is MIRATEC MB 522 which was unmodified, or modified with substances according to the invention or not according to the invention.

TABLE 7

|  | Comparison | According to the invention | |
|---|---|---|---|
|  | A 13 | B 28 | B 29 |
| Added to size | None | 1% EAA | 1% AATMP |
| 24 h 98% RH | 59 | 72 | 77 |
| 48 h 98% RH | 61 | 70 | 74 |
| 120 h 98% RH | 61 | 64 | 75 |

Table 7 shows the strengths in N/cm² of sized cores that were produced using the binder system NOVANOL 165. The size is VELVACOAT AC 501, which was unmodified, or modified with substances according to the invention or not according to the invention.

From the tables, can be seen that the CH-acidic compounds increase the moisture stability of sized cores.

Measuring Formaldehyde Emissions

Producing the Test Specimens Using the CB Method:

In a Hobart mixer, a sand mixture consisting of quartz sand H 32, plus 3% additive X, plus 1.0% ECOCURE 30 BG 5 and 1.0% ECOCURE 60 BG 5 (partially modified with a CH-acidic compound as a comparison) was mixed until homogeneous over two minutes. The CH-acidic compound was stirred fresh into ECOCURE 60 BG 5 and used directly for the sand mixture. This sand mixture was transferred to a Roeper H 1 core shooter and two round cores with a dimension (H×D) of 50 mm×50 mm were each shot into the mold with a shooting pressure of 4 bar using compressed air. The sand was cured with CATALYST 706 (1.0 ml, 10 second gassing time at a 2 bar flushing pressure).

Sizing Process:

The CH-acidic compounds listed in the table of results were stirred into the commercially available MIRATEC MB 522 while stirring. The MIRATEC MB 522 obtained in the delivered state was adjusted to a viscosity suited for the application using tap water (Ford beaker 4 mm, flow time 11-13 sec.), and the CH-acidic compound was stirred in dropwise over 10 minutes while stirring.

A 30-minute-old round core was completely dipped in the size to be tested so that the size layer completely covered the core surface which corresponds to a wet size application of approximately 7.5 g.

Measuring Setup:

14 round cores (core weight of approximately 2.1 kg) were stacked in a muffle furnace preheated to 175° C. so that the oven space was filled to the maximum. The core arrangement was chosen so that the cores do not touch each other at the side surfaces and were stacked in two layers in a cross bracing. After filling, the air was continuously sucked out of the furnace with a GS 312 Desaga pump (ventilation through the front furnace door, pump output of 3 liters/min), and the exhaust air was guided through three water-filled and ice-cooled washing bottles. The air was guided through the washing bottles over 90 minutes at a furnace temperature of 173-177° C.

Then the formaldehyde content in the three combined washing bottles was measured photometrically using a photometer acetyl acetonate method (analogous to VDI 3862 page 6: 2004-02) at 412 nm, and the measured value of mg formaldehyde per kg core weight was calculated.

TABLE 8

|  | Comparison | | | |
|---|---|---|---|---|
|  | A 20 | A 21 | A 22 | A 23 |
| Added to ECOCURE 60 BG 5 | None | 2.5% EAA | 8.5% EAA | 2.5% AATMP |
| Formaldehyde emissions in mg/kg | 12.5 | 8.9 | 2.1 | 8.6 |
| g CH-acidic compound per 14 round cores | 0 | 0.525 | 1.78 | 0.525 |

Table 8 shows the formaldehyde emissions of different comparative systems. All of the examples listed here were sized with unmodified MIRATEC MB 522. The ECOCURE 60 BG 5 used as part of the binder component for the cores was partly modified with a CH-acidic compound.

TABLE 9

|  | According to the invention | | |
|---|---|---|---|
|  | B 30 | B 31 | B 32 |
| Added to MIRATEC MB 522 | 5% EAA | 5% MEE | 1% EAA |
| Formaldehyde emissions in mg/kg | 0.53 | 4.2 | 0.85 |
| g CH-acidic compound per 14 round cores | 5.25 | 5.25 | 1.05 |

Table 9 shows the formaldehyde emissions of systems according to the invention. All cores were produced with the binder system ECOCURE 30 BG 5/ECOCURE 60 BG 5. The size MIRATEC MB 522 was modified corresponding to the information.

Tables 8 and 9 show that the effectiveness of a formaldehyde reducer applied on the size is much more effective than when the CH-acidic compound is introduced through the mold material binder (in particular examples A22 to B32 that permit a direct comparison through the applied amount of EAA).

Tables 8 and 9 show that the formaldehyde emissions can be reduced much more effectively when the CH-acidic compound is introduced through the size than in comparison to adding it through the mold material mixture, or respectively a binder component. This is clearly revealed in particular in examples A22 and B32; even though in example B32 much less CH-acidic compounds were introduced, the effect on formaldehyde reduction is much more significant.

The invention claimed is:
1. A sizing composition comprising:
(A) a CH-acidic compound that comprises at least one beta-dicarbonyl group,
  i) wherein the CH-acidic compound has the following formula:

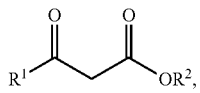

in which
  $R^1$ is a C1 to C18 hydrocarbon, and
  $R^2$ is H,
    a C1 to C18 hydrocarbon, wherein in $R^2$ optionally 1 to 3 oxygen atoms may be contained in the hydrocarbon,
    and/or
  ii) wherein the CH-acidic compound has several beta-dicarbonyl groups of formula $R^1C(=O)-CH_2-C(=O)-O-$  (I)

in which $R^1$ is a C1 to C12 hydrocarbon,
  and/or
  iii) wherein the CH-acidic compound is a malonic acid diester of alcohols with a C-chain of C1 to C18;
(B) at least 20% by weight of a carrier liquid comprising or consisting of water; and
(C) refractory base materials.

2. The sizing composition according to claim 1, wherein the $CH_2$ group of the CH-acidic compound has, at 298 K, a $pKa_1$ of less than 15, in particular 5 to 12.

3. The sizing composition according to claim 1, wherein the CH-acidic compound the group is selected from the group consisting of: methyl acetoacetate, ethyl acetoacetate, benzyl acetoacetate, dodecyl acetoacetate, ethyl benzoylacetate, 2-methoxyethyl acetoacetate, 2-(acetoacetoxy)ethyl methacrylate, propane-1,1,1-triyltrimethyl-tris-(acetoacetate) and their mixtures, in particular methyl acetoacetate, ethyl acetoacetate, propane-1,1,1-triyltrimethyl-tris-(acetoacetate), diethyl malonate or 2-(acetoacetoxy)ethyl methacrylate.

4. The sizing composition according to claim 1, wherein the size composition, at 298 K, has a pH of 6 to 10 preferably 6.5 to 8.5.

5. The sizing composition according to claim 1, wherein the concentration of the CH-acidic compound in the sizing composition is 0.1 to 10% by weight.

6. The sizing composition according to claim 1, wherein the carrier liquid comprises more than 50% by weight water and moreover may optionally comprise alcohols, including polyalcohols and polyether alcohols.

7. The sizing composition according to claim 1, wherein the solid content of the sizing composition in the ready-to-use sizing composition before use is either 30 to 80% by weight before dilution, or is 10 to 70% by weight after dilution.

8. The sizing composition according to claim 1, wherein the sizing composition comprises more than 40% by weight carrier liquid.

9. The sizing composition according to claim 1, wherein the carrier liquid is completely vaporable at 160° C. and 1013 mbar.

10. The sizing composition according to claim 1, wherein the sizing composition contains 10 to 80% by weight, preferably 30 to 70% by weight, refractory base materials relative to the solid content of the sizing composition.

11. The sizing composition according to claim 1, wherein the refractory base materials are selected from the group consisting of: quartz, aluminum oxide, zirconium dioxide, aluminum silicate, zircon sands, zirconium silicates, olivine, talcum, mica, coke, feldspar, diatomite, calcined kaolins, kaolinite, metakaolinite, iron oxide, bauxite or mixtures thereof.

12. The sizing composition according to claim 1, wherein the refractory base materials have particle sizes of 0.1 to 300 μm, in particular 1 to 280 μm, measured by means of light scattering pursuant to DIN/ISO 13320.

13. The sizing composition according to claim 1, wherein the sizing composition comprises 0.1 to 20% by weight, in particular 0.5 to 5% by weight, of at least one binder relative to the solid content of the sizing composition.

14. The sizing composition according to claim 1, further comprising graphite in the amount of 0 to 30% by weight, relative to the solid content of the sizing composition.

15. The sizing composition according to claim 1, further comprising at least one clay selected from the group consisting of: Palygorskite, hectorite and sodium bentonite.

16. The sizing composition according to claim 1, further comprising: a clay, comprising 50 to 90% by weight kaolinite and 5 to 35% by weight montmorillonite; and
mica, wherein the sizing composition comprises 5 to 50% by weight clays relative to the solid components.

17. A casting mold or core, coated entirely or partially on the surface with the sizing composition according to claim 1, optionally after dilution with at least water, wherein the casting mold or core is obtained from a mold material mixture after at least partial curing.

18. The casting mold or core according to claim 17, wherein the curing is performed by a method selected from the group consisting of: PU cold-box, PU no-bake, Resol-$CO_2$, BETASET or Epoxy-$SO_2$ methods, in particular PU cold-box, PU no-bake or Resol-$CO_2$ methods.

19. The casting mold or core according to claim 17, wherein the sizing composition has a dry layer thickness of 0.1 to 1 mm.

20. A method for producing the casting mold or core of claim 17, comprising the steps of:
shaping a casting mold or core from the mold material mixture;
curing, at least partially, the casting mold or core and applying the sizing composition of claim 1 to the casting mold or core.

21. The method of claim 20, further comprising the steps of:
exposing the sizing composition to a temperature of 100 to 200° C., in particular 120 to 180° C. to dry the sizing composition, in particular in a continuous furnace.

22. The method according to claim 20, wherein the step of curing is performed by a method selected from the group consisting of: PU cold-box, PU no-bake, Resol-$CO_2$, Betaset and Epoxy-$SO_2$ methods, in particular the PU cold-box, PU no-bake or Resol-$CO_2$ method.

* * * * *